(12) United States Patent
Büchler et al.

(10) Patent No.: US 10,449,628 B2
(45) Date of Patent: Oct. 22, 2019

(54) PRESSURE WELDING DEVICE AND PRESSURE WELDING METHOD

(71) Applicant: KUKA INDUSTRIES GMBH, Augsburg (DE)

(72) Inventors: Michael Büchler, Augsburg (DE); Otmar Fischer, Augsburg (DE); Harald Meyer, Augsburg (DE); Klaus Schneider, Friedberg (DE)

(73) Assignee: KUKA INDUSTRIES GMBH, Augsburg (DE)

( * ) Notice: Subject to any disclaimer, the term of this patent is extended or adjusted under 35 U.S.C. 154(b) by 75 days.

(21) Appl. No.: 15/525,412

(22) PCT Filed: Nov. 12, 2015

(86) PCT No.: PCT/EP2015/076410
§ 371 (c)(1),
(2) Date: May 9, 2017

(87) PCT Pub. No.: WO2016/075223
PCT Pub. Date: May 19, 2016

(65) Prior Publication Data
US 2017/0348793 A1    Dec. 7, 2017

(30) Foreign Application Priority Data
Nov. 12, 2014   (DE) .................... 20 2014 105 435 U (51) Int. Cl.
*B23K 20/00*   (2006.01)
*B23K 9/00*   (2006.01)
(Continued)

(52) U.S. Cl.
CPC ................ *B23K 20/12* (2013.01); *B23K 9/08* (2013.01); *B23K 20/02* (2013.01)

(58) Field of Classification Search
None
See application file for complete search history.

(56) References Cited

U.S. PATENT DOCUMENTS 3,570,740 A    3/1971  Stamm
3,740,827 A    6/1973  Hunter et al.
(Continued)

FOREIGN PATENT DOCUMENTS

DE    20 56 003 A1    6/1971
DE    26 47 735 A1    5/1977
(Continued)

*Primary Examiner* — Devang R Patel
(74) *Attorney, Agent, or Firm* — McGlew and Tuttle, P.C.

(57) ABSTRACT

A pressure welding method and to a pressure welding device (1) are provided. The pressure welding device (1) includes a plastification device (7), an upsetting device (8) and component mountings (34, 35, 36, 37) for the components (2, 3, 3', 4) to be welded together and a machine frame (12). The pressure welding device (1) includes a machine head (13) which is arranged so as to move on the machine frame (12). The machine head (13) includes a rotatable spindle (54) and a component mounting element (34, 35) as well as an associated spindle drive (56). The machine head (13, 14) and the spindle drive (56) are separated from each other on the machine frame (12). A controllable mass decoupling (79) including an axially tolerant coupling (80), is arranged in the drive train (57) between the fixed or moveable spindle drive (56) arranged on the machine frame (12).

18 Claims, 6 Drawing Sheets

(51) Int. Cl.
  *B23K 20/12*   (2006.01)
  *B23K 20/02*   (2006.01)
  *B23K 9/08*    (2006.01)

(56) References Cited

U.S. PATENT DOCUMENTS

| | | | | |
|---|---|---|---|---|
| 3,784,080 | A * | 1/1974 | Ditto | B23K 20/12 |
| | | | | 228/2.3 |
| 4,043,497 | A * | 8/1977 | Jones | B23K 20/12 |
| | | | | 228/13 |
| 4,733,814 | A * | 3/1988 | Penman | B23K 20/12 |
| | | | | 228/114.5 |
| 5,795,419 | A * | 8/1998 | Lotz | B23K 20/121 |
| | | | | 156/350 |
| 7,975,897 | B2 * | 7/2011 | Semmlinger | B23K 20/12 |
| | | | | 228/112.1 |
| 2010/0206861 | A1 * | 8/2010 | Rudolph | B23K 20/121 |
| | | | | 219/137 R |
| 2016/0228978 | A1 * | 8/2016 | Buchler | B23K 9/08 |

FOREIGN PATENT DOCUMENTS

| | | |
|---|---|---|
| DE | 19 35 393 C2 | 12/1982 |
| DE | 44 17 625 A1 | 11/1995 |
| DE | 199 02 357 A1 | 8/2000 |
| DE | 20 2004 009909 U1 | 12/2005 |
| DE | 20 2004 010386 U1 | 12/2005 |
| EP | 2163338 A1 * 3/2010 ............. B23K 20/02 |
| JP | 2011 025281 A | 2/2011 |
| WO | 86/05134 A1 | 9/1986 |

\* cited by examiner

PRESSURE WELDING DEVICE AND PRESSURE WELDING METHOD

CROSS REFERENCE TO RELATED APPLICATIONS

This application is a United States National Phase Application of International Application PCT/EP2015/076410, filed Nov. 12, 2015, and claims the benefit of priority under 35 U.S.C. § 119 of German Application 20 2014 105 435.9, filed Nov. 12, 2014, the entire contents of which are incorporated herein by reference.

FIELD OF THE INVENTION

The present invention pertains to a pressure welding device and to a pressure welding method.

BACKGROUND OF THE INVENTION

Such a pressure welding device is known from practice. It may be configured as a friction welding device or as a welding device with a magnetically rotatingly driven arc and has in both variants a plasticization device and an upsetting device each as well as component mounts for the components to be welded together. It further has a machine frame, on which a machine head with a rotatable spindle, with a spindle drive and with a component mount is movably arranged.

SUMMARY OF THE INVENTION

An object of the present invention is to provide an improved pressure welding technique.

The pressure welding technique according to the invention, i.e., the pressure welding device and the pressure welding method, has various advantages. The pressure welding device and the pressure welding method make it possible, on the one hand, to increase the performance capacity and the quality of the process during pressure welding. On the other hand, the degree of automation and hence also the economy can be improved. Set-up and downtimes can be largely avoided or at least reduced. In addition, ergonomics is improved.

The mass decoupling device according to the invention has the advantage that the moving mass can be significantly decreased and reduced to the machine head during the process stroke. This is favorable for the precision of the stroke and the quality of welding and is especially advantageous for difficult welding processes, which require accurate control and regulation of the component feed. The rotating drive torque can furthermore be transmitted to the decoupled machine head by means of an axially tolerant coupling.

The spindle drive is preferably mounted movably, especially displaceably along the machine axis on the machine frame. It can be carried by the machine head during the feed stroke. The mass decoupling and the change in distance preferably take place only during the process stroke. This brings about a limitation of the change in the distance as well as of the extension length of the axially tolerant coupling and is favorable for the loss-free transmission of the drive torque.

The motion characteristics of the machine head can be detected in the process with a motion sensor, especially an acceleration sensor. This makes it possible to monitor and regulate the dynamic conditions in the pressure welding process.

The machine head is moved by an upsetting drive. This drive brings about the feed and process stroke and may have any desired and suitable configuration.

Within the framework of an independent inventive idea, the upsetting device is modified with an upsetting drive, which is arranged between the machine head and the upsetting head and acts by pulling. This drive has two or more parallel cylinders, which are arranged along and on both sides next to the machine axis. The cylinder housings are preferably supported at the preferably stationary machine head and permanently connect the extensible piston rods at their free ends with the upsetting head. The upsetting forces are transmitted hereby in a manner favorable in terms of kinking as pulling forces rather than forces of pressure as before as in the state of the art.

Within the framework of the independent inventive idea, the pressure welding device has a plasticization device and an upsetting device as well as a mounting, especially component mounts, for the components to be welded together and a machine frame as well as a machine head and an upsetting or support head, which are movable relative to one another along a machine axis on the machine frame, the upsetting device having an upsetting drive with two or more parallel drive units, which are arranged along and on both sides next to the machine axis, said upsetting drive being arranged between the machine head and the upsetting or support head and acting by pulling. In another embodiment, the machine head is arranged movably on the machine frame, and the upsetting or support head is arranged permanently secured on the frame. Further, the machine head may have a rotatable spindle and a component mount as well as a corresponding spindle drive.

In addition, this makes possible a flow of forces in a closed circuit and between the machine head and the upsetting head, which ensures improved support of forces and avoids undesired deformations and relieves the load on the machine frame. The ergonomics and the accessibility at the operating area and on the operating side of the pressure welding device can be improved due to the different vertical positions of the cylinders, especially of the piston rods thereof.

Further advantageous additions may be made for the pressure welding device by means of additional components.

This pertains, e.g., to an actuating device arranged in the drive train between the spindle drive and the spindle for a clamping device at the component mount of the machine stock or headstock. The drive toque can now be transmitted via the drive housing of an actuating drive in an extensively deformation-free manner. It is thus also possible to transmit very high torques in conjunction with a clamping device actuating device.

The actuating device may have a compact and lightweight configuration, so that it can be associated with the machine head and moved together with same without loss in the process and welding quality. In addition, it simplifies the configuration of the component mount and reduces the weight thereof. All this is especially advantageous for the welding and process quality in conjunction with the mass decoupling device.

On the other hand, a direct drive is possible, in which the drive motor with its motor axis can be aligned essentially flush with the spindle axis. Due to the separation of the actuating device from the drive motor, the latter may have any desired configuration. This makes possible the use of cost-effective standard motors. In addition, a direct drive is especially favorable for displaceable machine heads and for the mass decoupling device.

In many cases, the direct drive eliminates the need for previously often necessary intermediate gears with a belt drive. The introduction of transverse forces into the drive train can be avoided. The susceptibility to wear is markedly reduced.

The actuating device has, in addition, advantages for the operating material supply. A rotary feed device, which can be adapted to the operating material or to the particular operating material, may be provided for this. The rotary feed device has a very compact configuration and has advantages for recycling oil overflow. It may likewise be arranged between the spindle drive and the machine stock. This has, in addition, the advantage of good accessibility for installation, inspection and maintenance purposes.

The pressure welding device may have various configurations. It may be configured, e.g., as a friction welding device. The components are preferably aligned now along the machine axis and plasticized by friction on their front edges facing one another and are connected to one another by subsequent axial upsetting. The machine axis forms the process axis. As an alternative, a pressure welding with a rotatingly moved arc is possible. The arc rotation may be controlled here by a drive device. Such a pressure welding device may likewise have a rotatable component mount at the machine head.

In addition, additional components, e.g., a multiple disk brake and a rotary coupling for compensating alignment errors, may be accommodated in the drive train. In addition, a measuring device for the drive torque and possibly the speed of rotation may be implemented.

It is further possible to combine the drive motor with a disk flywheel arrangement, which may be seated in front of or behind the drive motor when viewed from the machine head. A substantially wider bandwidth and freedom of configuration is obtained for the spindle drive. In addition, this makes adaptation possible to different requirements of the machine, operation or process.

The mass decoupling device according to the invention has, in addition, advantages for the arrangement and the function of additional components of the pressure welding device.

An adjusting device makes possible a simple and rapid adaptation of the pressure welding device to different component dimensions, especially component lengths. This adaptation pertains especially to the component mount arranged floatingly between the machine head and the upsetting head. It may take place automatically.

Optimization of the pressure welding process and optimal contacting of the components to be welded together and of the upsetting head is also achieved with the adjusting device. This is also advantageous for the optimization of the process sequences, especially a programmed control of the plasticization and upsetting phases as well as of the feeds and component shortenings occurring in the process. As a result, welded parts of very high quality can be produced. This pertains, on the one hand, to the quality of the welded connection and, on the other hand, to the constant length of the welded parts.

Further, a machining device may be provided, which makes possible the finishing of the welded part in the mounted or clamped position at the pressure welding device. Machining is carried out, for example, at the weld joint or weld joints, where the ring-shaped weld bead present there is removed. This is efficient and saves time, additional effort and costs. The welded parts are often in the immediate vicinity of the machine head and of the component mount located there, which may lead to space problems. Said adjusting device makes it possible to form a distance between the machine head and the associated additional component mount, as a result of which sufficient space is created for the machining and good accessibility to the machining site, especially to the weld joint.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, the present invention pertains to a pressure welding device (1) and to a pressure welding method.

The pressure welding device (1) and the pressure welding method may have various configurations. Common to the different variants are a plasticization device (7) and an upsetting device (8), with which the components (2, 3, 3', 4) to be welded together are melted or softened on the sides or edges facing each other and are subsequently upset while forming a welded part (5, 5'). The upsetting device (8) has an upsetting drive (22) for this, which moves the components (2, 3, 3', 4) relative to one another.

The pressure welding device (1) further has a machine and process control (not shown), which is connected to the machine components described below and controls these. The machine and process control is, in addition, connected to the sensing, detection or measuring devices mentioned below and processes the signals thereof. It may have a memory-programmable configuration and contain one or more process or sequence programs, a technology data bank, memories for programs and recorded process data, a quality monitoring along with logging or the like.

The plasticization device (7) and the plasticization method may have various configurations. The pressure welding device (1) is configured as a friction welding device in the embodiments shown in FIGS. 1 and 3, and the plasticization device (7) has a friction device (9).

In one variant, not shown, the plasticization device (7) may have an arc device, which heats and partially melts the component edges with an arc, the arc being moved rotatingly with magnetic force along the circumference of the components by means of a drive device.

In the different variants, the pressure welding device (1) has a machine frame (12) with a longitudinal or machine axis (6) and a mounting (11) with component mounts (34, 35, 36, 37) for the components (2, 3, 3', 4) to be welded together. The machine frame (12) has a floor-mounted machine bed, on which the components of the pressure welding device (1), which will be explained below, are arranged. Further, an operating material supply unit (19) is present. It makes available the needed operating materials, especially electric current, hydraulic fluid, compressed air, lubricant and coolant or the like and routes these to the respective consumers.

The pressure welding device (1) has an enclosing protective housing with a closable access on the operating side (20). Here, a worker or a robot can feed the components (2, 3, 3', 4) to be joined and remove the finished welded part (5, 5').

The pressure welding of the components (2, 3, 3', 4) takes place in the direction of the machine axis (6), along which the components (2, 3, 3', 4) are also aligned. The components (2, 3, 3', 4) are plasticized now on the front sides or edges facing each other, especially by rotating friction or by the rotating arc, and upset along the machine axis (6). The machine axis (6) forms the process axis for the plasticization and upsetting.

The components (2, 3, 3', 4) may consist of different materials. Metallic materials, especially steel, light metal alloys, cast alloys or the like are preferably used. The material pairings may be different. Especially iron-containing materials may be joined in this case with nonferrous materials. In addition, nonmetallic materials, e.g., ceramic materials, may be welded, especially in conjunction with another metallic material.

Figure 1:
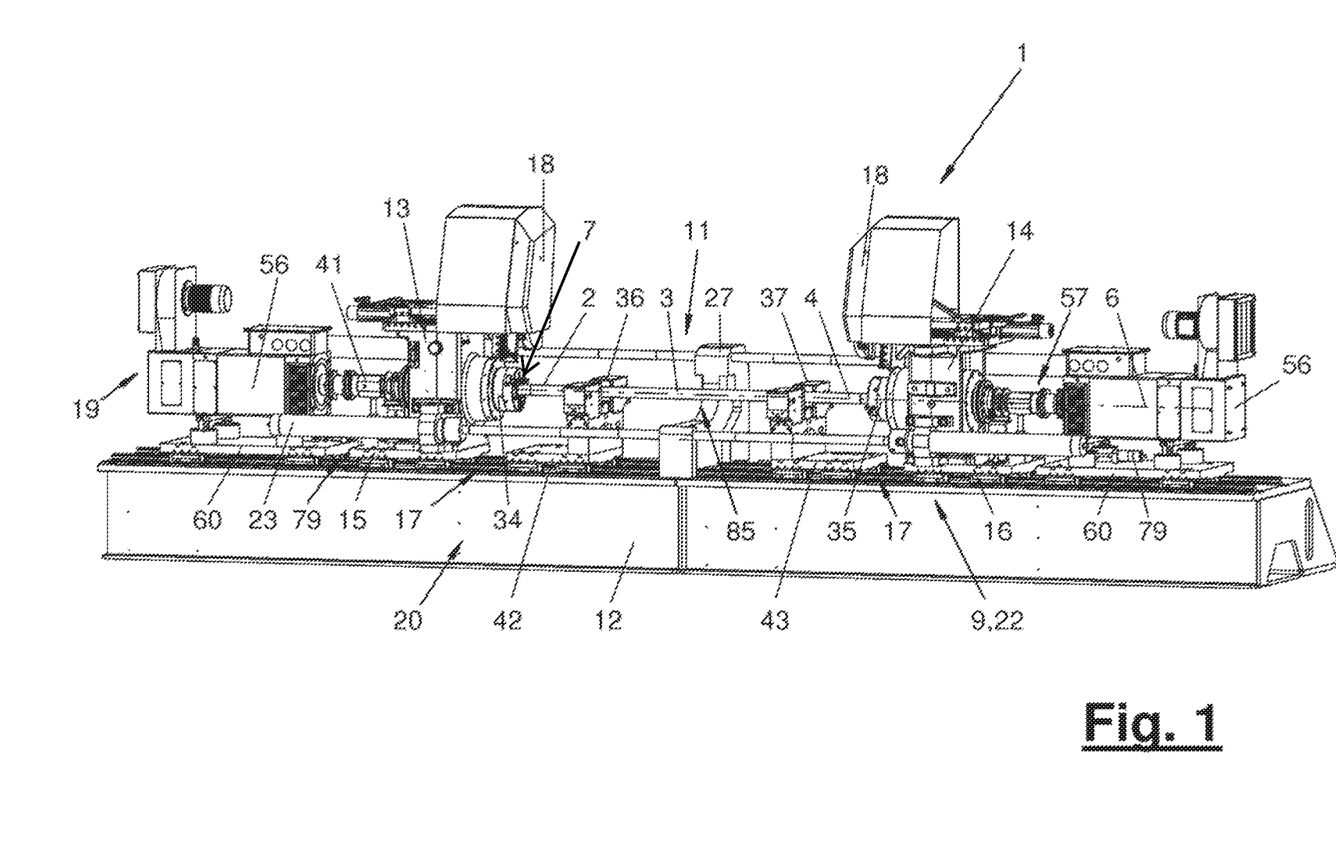
FIG. 1 is a perspective side view showing a pressure welding device with a mass decoupling device.
Figure 2:
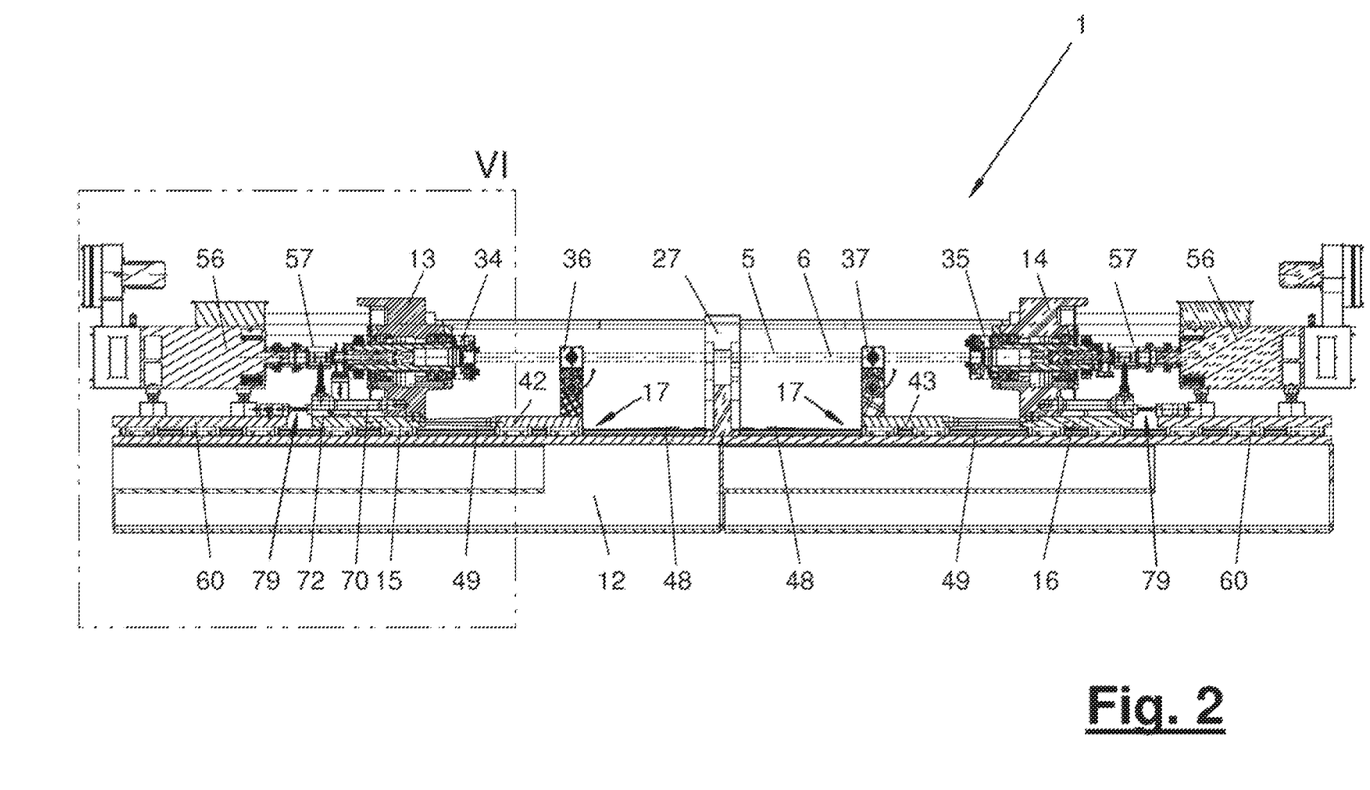
FIG. 2 is a longitudinal sectional view showing the pressure welding device from FIG. 1.

FIGS. 1 and 2 show a first variant of the pressure welding device (1) in the form of a double-head machine, in which two outer components (2, 4) are preferably welded simultaneously to the edges of a central component (3). A three-part welded part (5) is formed as a result.

Figure 3:
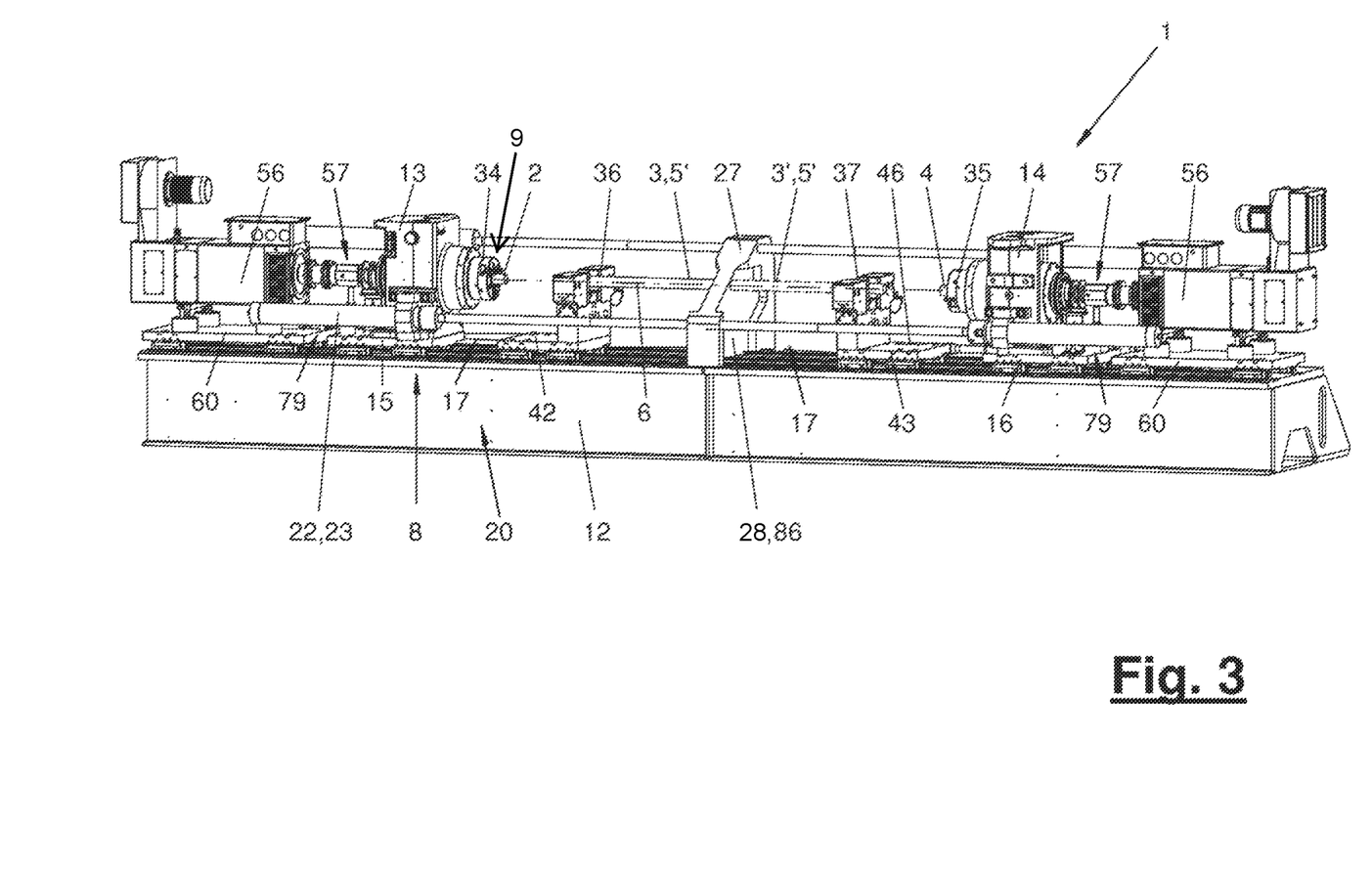
FIG. 3 is a perspective side view showing a variant of the pressure welding device from FIG. 1.

FIG. 3 shows a second variant, which is configured as a double single-head machine, in which end-side components (2, 4) are welded each to a component (3, 3'), wherein two-part welded parts (5') are formed. These two welding processes may take place independently from one another. Further, a configuration of the pressure welding device (1), not shown, as a simple single-head machine is possible, which is represented, e.g., as a variant, especially a halving, of the pressure welding device (1) from FIG. 3.

In the different variants, the pressure welding device (1) always has at least one machine head (13, 14) with a component mount (34, 35), which machine head is arranged movably on the machine frame (12). The machine head (13, 14) may also have a detection device for path and/or position.

Two machine heads (13, 14) are arranged movably on the machine frame (12) opposite each other in relation to the machine axis (6) in the variant of the double-head machine shown in FIGS. 1 and 3. Only one movable machine head (13) is provided in the above-mentioned single-head machine. The number of machine heads may also be greater than two in other variants. The multiple machine heads (13, 14) are preferably of identical configuration, but they may also be different as an alternative.

The machine head or machine heads (13, 14) are each arranged movable, especially axially movable in relation to the machine frame (12), especially the machine bed thereof. They are arranged for this, e.g., on a carrier (15, 16), which is guided and supported displaceably on the machine bed along the machine axis (6) by means of a guide (32) oriented along the machine axis (6).

The machine head (13, 14) is moved by the respective upsetting drive (22). An upsetting drive (22) of its own is associated with each machine head (13, 14) in the exemplary embodiments shown in FIGS. 1 and 3. This drive may be supported on a central upsetting head or support head (27) arranged stationarily on the machine frame (12). Such a stationary upsetting or support head (27) may also be present in a single-head machine. An upsetting drive (22) common for both machine heads (13, 14) may also be used in a variant of the pressure welding device (1), e.g., a double-head machine. The upsetting drive (22) generates pulling forces in the preferred embodiment, which will be explained in more detail below.

In the exemplary embodiments shown, the pressure welding device (1), especially the friction device (9), has a rotatable shaft (54) each at the machine head (13, 14), which shaft will hereinafter be called a spindle, a component mount (34, 35) arranged on the front side at the spindle (54), a headstock and a spindle drive (56). The headstock (53) contains the mount, guide and support of the spindle (54) and is arranged and supported at the machine head (13, 14). A drive train (57), which extends along the machine axis (6) and is preferably aligned with same, is located between the component mount (34, 35) and the spindle drive (56).

The machine head (13, 14) and the corresponding spindle drive (56) are arranged separately from one another and are each mounted independently on the machine frame (12). They are arranged one after another at spaced locations in the direction of the machine axis (6). A controllable mass decoupling device (79) is arranged between the machine head (13, 14) and the corresponding spindle drive (56).

Such an arrangement may also be present in the above-mentioned variant of the plasticization device (7) with an arc device.

The spindle drive (56) is configured as a direct drive in the embodiment shown. It has a drive motor (58), whose motor shaft (59) is aligned essentially flush with the longitudinal axis of the spindle (54) and with the machine axis (6). The motor shaft (59) is coupled via a coupling (62) with the spindle (54) or with an actuating device (41) to be explained below for the component mount (34). The coupling (62) has a nonrotating and flexurally elastic configuration. It can compensate possible alignment errors, especially lateral offset and/or oblique position. Further, a controllable brake (not shown) may be located in the drive train (57).

As an alternative, the drive motor may be arranged laterally offset from the spindle (54) as well as the machine axis (6) and drive the spindle (54) via an intermediate gear, especially a belt drive.

In another variant, the spindle drive (56) may have a disk flywheel arrangement (not shown). The disk flywheels are set into rotation about the machine axis (6) by the drive motor and then bring about an inertia drive for the spindle (54), and a controllable brake can control or regulate the speed of rotation in the drive train (57) and possibly also stop the rotation. The disk flywheel arrangement can be separated from the drive motor (58) and optionally from the spindle (54) by means of a coupling.

The spindle drive (56) is arranged in the exemplary embodiments shown on a slide-shaped drive carrier (60) and is mounted axially displaceably on the machine frame (12). It may be mounted and guided on the same guide (32) as the corresponding machine head (13, 14). If a disk flywheel arrangement is present, this may likewise be arranged on the drive carrier (60).

In one variant, not shown, the spindle drive (56) may be arranged stationarily on the machine frame (12). A possible disk flywheel arrangement is also stationary in this case.

The controllable mass decoupling device (79) can couple the machine head (13, 14) moved by the upsetting drive (22) with the spindle drive (56) or decouple it from same as needed during its axial feed along the machine axis (6). The mass of the spindle drive (56) and of the drive carrier (66) thereof as well as optionally of the disk flywheel arrangement and additional components are carried along during the feed in the coupled state. This carrying does not take place in the decoupled state. The coupling preferably takes place mechanically. The mass decoupling device (79) can be controlled via said machine control.

Figure 5:
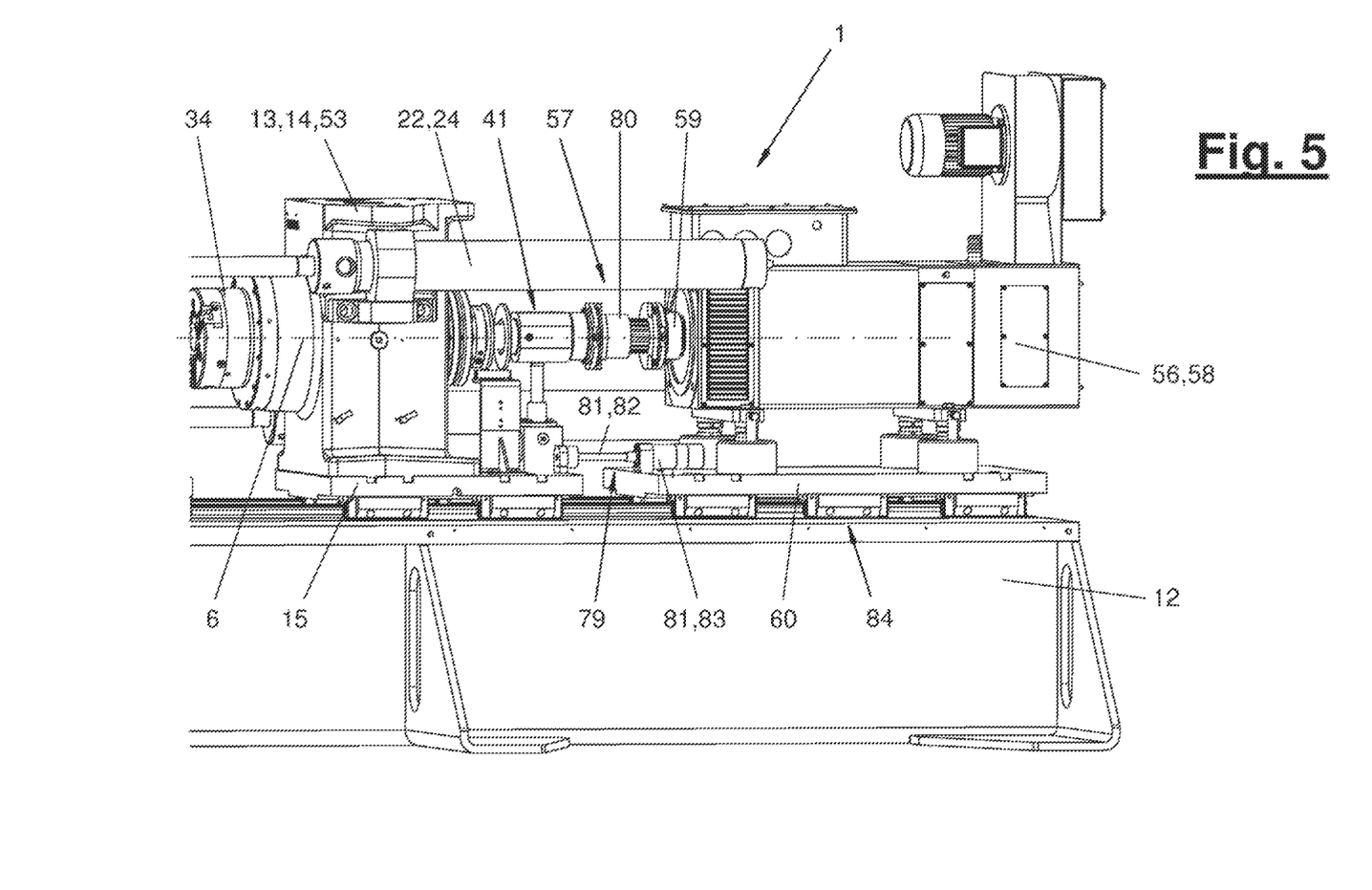
FIG. 5 is a perspective side view showing the arrangement according to FIG. 4 in another operating position.
Figure 6:
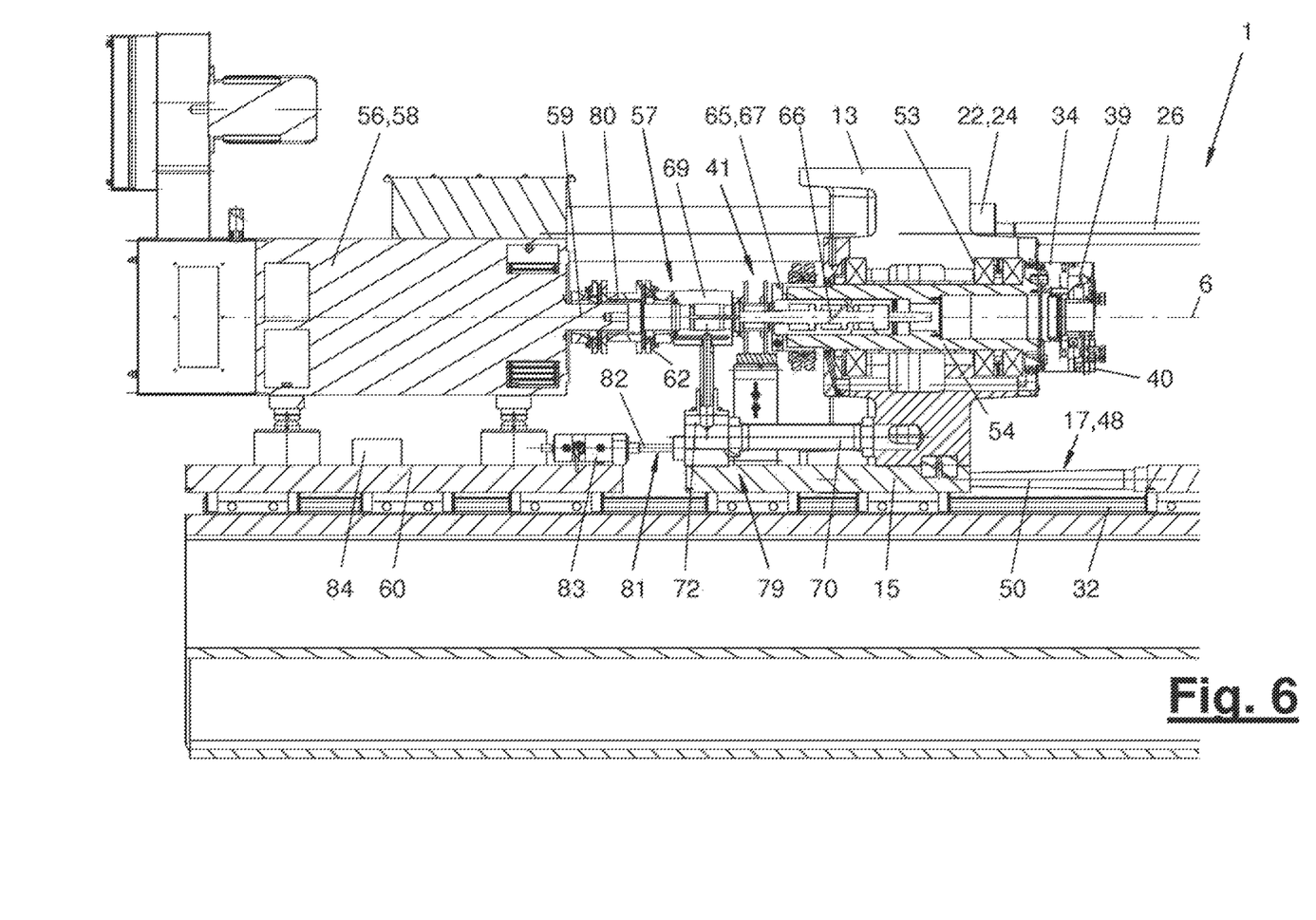
FIG. 6 is an enlarged view of detail VI of FIG. 2 with the machine head, the spindle drive and the mass decoupling device.

The machine head (13, 14) and the corresponding spindle drive (56) are axially connected by said drive train (57). The mass decoupling device (79) has an axially tolerant coupling (80) in the drive train (57). The axially tolerant coupling (80) is also called rectilinear sliding joint. It can ensure the maintenance of the rotating drive during the feed of the machine head (13, 14). It may be configured, e.g., as a sliding sleeve on the drive shaft (59) with meshing teeth. The teeth are preferably configured as splined joints with straight tooth orientation along the machine axis (6). FIGS. 5 and 6 show this configuration.

In one alternative, not shown, the axially tolerant coupling (80) may bring about a mutual spacing of the machine head (13, 14) and drive motor (58), eliminating the drive transmission. For example, a disk flywheel arrangement may be associated with the spindle (54) and with the machine head (13, 14) in such a case.

The mass decoupling device (79) may further have a detachable coupling device (81) between the spindle drive (56) and the machine head (13, 14). The coupling device (81) may be connected to the carriers (15, 16, 60). The coupling device (81) is controllable and represents a detachable mechanical connection between the machine head (13, 14) and the corresponding spindle drive (56). The machine head (13, 14) can move the spindle drive (56) along or uncouple or decouple it as needed via the coupling device (81) during its feed.

The coupling device (81) has a coupling element (82) with variable working length. This element acts in the direction of the machine axis (6). It is preferably configured as a straight coupling rod. Another design embodiment is possible as an alternative.

The coupling element (82) is connected to the machine head (13, 14) and to the corresponding spindle drive (56). The coupling device (81) further has a detachable locking device (83) for the coupling element (82), which device is connected to the spindle drive (56) and/or to the machine head (13, 14).

In the exemplary embodiments shown, the detachable locking device (83) is arranged at the spindle drive (56), especially at the drive carrier (60), and meshes with one end area of the coupling element (82) in a movable and lockable manner. The other end of the coupling element (82) is secured to the machine head (13, 14), especially to the carrier (15, 16) thereof. The above-mentioned association may also be reversed.

The coupling element (82) dips into the locking device (83) or passes through same. The coupling connection mentioned can be opened or closed by actuating the locking device (83). The locking device (83) may have any desired and suitable configuration and may operate, e.g., with clamping connection or positive-locking connection. It is configured as a rod clamping in the exemplary embodiments shown.

The spindle drive (56) may further have a controllable drive fixing device (84), with which it can be temporarily fixed as needed at the machine bed (12). The drive fixing device (84) may be configured, e.g., as a clamping device at the drive carrier (60), which acts against the machine bed (12) or the guide (32) and is connected to the machine control.

Figure 4:
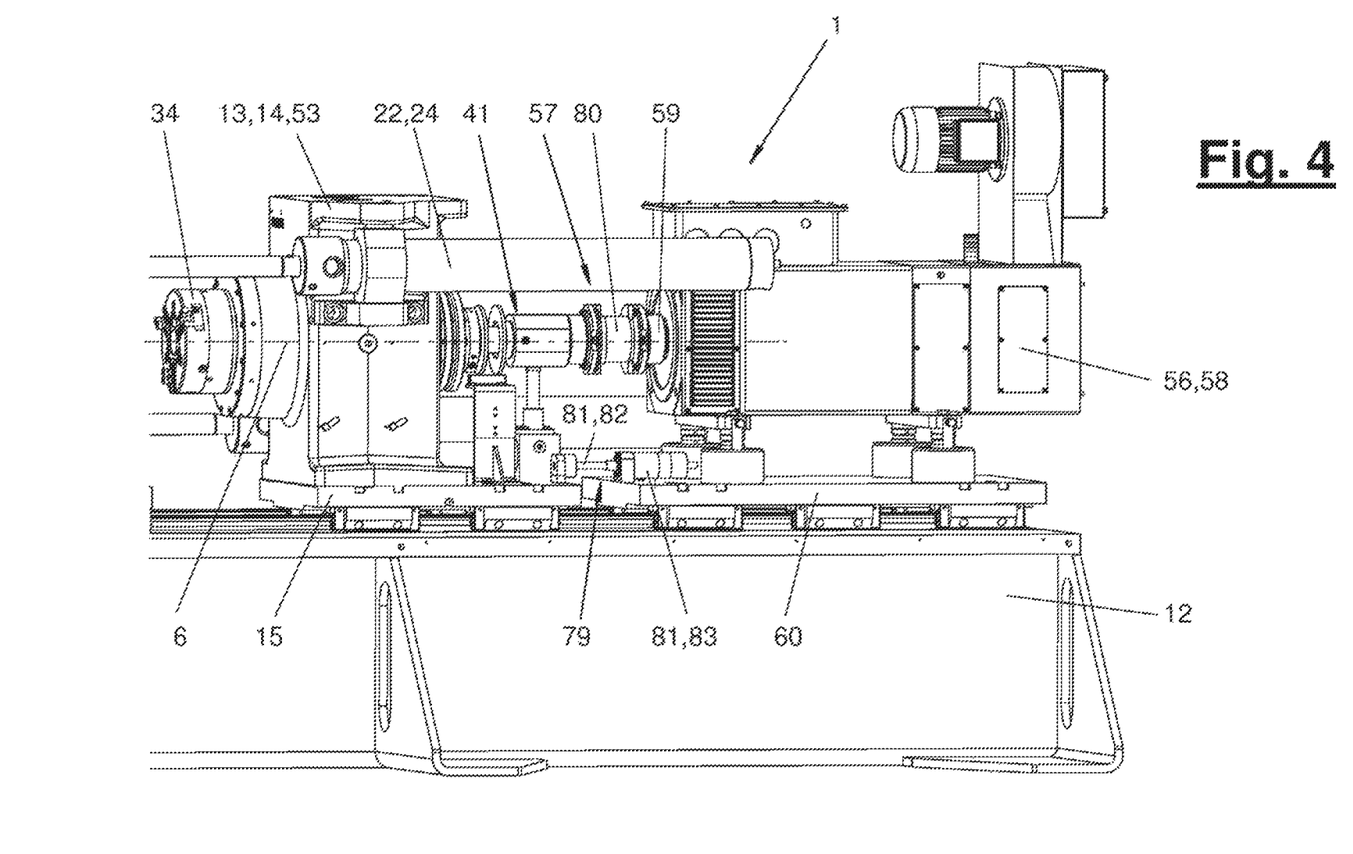
FIG. 4 is a perspective side view of the machine head, of the spindle drive and of the mass decoupling device of the pressure welding device from FIGS. 1 and 3 in a first operating position.

At the beginning of the pressure welding process, the machine head (13, 14) performs an axial feed stroke, during which the components (2, 3, 3', 4) to be welded together are moved towards one another and are brought into contact. The feed stroke may take place by quick motion. The mass decoupling device (79) is controlled such that it establishes a coupled connection between the machine head (13, 14) and the corresponding spindle drive (56) during this feed stroke, so that these are moved together. The locking device (83) is now closed and the mechanical coupled connection is established. FIG. 4 shows this operating position.

The drive fixing device (84) of the spindle drive (56) is actuated and the previously closed coupling device (81) is released as well as the coupling (80) is stretched at the end of the feed stroke. This leads to mass decoupling, so that the machine head (13, 14) is moved by the upsetting drive (22) alone during the subsequent axial process stroke. This operating position is shown in FIG. 5.

The process stroke can take place at reduced speed. In friction welding, this can be classified into a friction feed (friction phase) for plasticization and a subsequent upsetting feed (upsetting phase) for connecting the plasticized areas of the components. The process stroke can be carried out more precisely and sensitively due to the decoupling and mass reduction.

The pressure welding device (1) may have a motion sensor (not shown) for the machine head (13, 14). The travel or feed motions of the machine head (13, 14) are detected hereby. Detection of the velocity and/or acceleration may take place during the motion sensing. The motion sensor may be configured, e.g., as an acceleration sensor. It is associated, e.g., with the machine head (13, 14). As an alternative, the motion sensor may be arranged at another location, e.g., at the upsetting drive (22) or on the machine frame (12). It may also have another configuration.

After the end of the process stroke, the machine head (13, 14) is returned again into its starting position. The spindle drive (56) can again be coupled in an intermediate position by closing the coupling device (81) and carried for the rest of the return motion.

The mounting (11) for the components (2, 3, 3', 4) has, in addition to the component mount (34, 35) at the respective machine head (13, 14), an additional component mount (36, 37), which is arranged movably between the upsetting or support head (27) on the machine frame (12). The additional or central component mount (36, 37) is preferably mounted displaceably along the machine axis (6). The respective component mount (36, 37) may have for this a slide, which is likewise mounted longitudinally displaceably on the guide (32).

The additional or central component mount (36, 37) may be fixed when needed at the machine bed (12), especially at the guide (32) by clamping or in another manner by means of a controllable fixing device (46). The fixing device (46) has, e.g., an elastically prestressed clamping against the guide (32), which can be released hydraulically.

Two such central component mounts (36, 37) are arranged between the end-side machine heads (13, 14) in the double-head machine shown in FIGS. 1 and 2 and they together receive a central and hence third component (3). An additional or central component mount (36, 37) each, which receives an individual additional component (3, 3'), is associated with each machine head (13, 14) in the double single-head machine shown in FIG. 3. A machine head (13) and an additional component mount (36) are present in the single-head machine, not shown, and this component mount receives an additional component (3).

The component mounts (34, 35, 36, 37) can receive the respective component (2, 3, 3', 4) in any desired and suitable manner. They preferably have for this a remotely controllable clamping device (39) each with adjustable clamping elements (40) and an actuating device (41). The clamping device (39) may be configured as a chuck, optionally of a one-step or multistep configuration, or as a self-centering chuck or in another manner.

The upsetting devices (8) act in the exemplary embodiments shown in FIGS. 1, 2 and 3 between the respective machine heads (13, 14) and the preferably central upsetting or support head (27). The upsetting device (8) now generates pulling forces in the direction of the machine axis (6). It has an upsetting drive (22), which is arranged between the machine head (13, 14) and the upsetting or support head (27) and is connected to both. The upsetting drive (22) acts by pulling and pulls the components (13, 14, 27) towards one another.

The upsetting drive (22) may have various configurations. In the exemplary embodiments shown, it has two or more parallel drive units (23, 24), which are aligned along the machine axis (6). The drive units (23, 24) are arranged on different sides of the machine axis (6), especially on both sides and diametrically opposite each other in relation to the machine axis (6). The drive units are preferably configured as cylinders.

The drive units (23, 24) may be configured, as an alternative, in another manner, e.g., as electric rod or spindle drives. The arrangements and embodiments explained below in connection with the cylinders (23, 24) shown correspondingly also apply to other embodiments of drive units.

The cylinders (23, 24) are arranged at different levels above the machine bed (12). The cylinder (23) located adjacent to the operating area or the operating side (20) is arranged in a low position and just barely above the top side of the machine bed (12).

The cylinders (23, 24) are preferably configured as hydraulic cylinders. They have an extensible piston rod (26) and a cylinder housing (25) each. The cylinder housings (25) are preferably mounted and supported on the machine head (13). The free ends of the piston rods (26) are secured to the upsetting head (27). The drive housing (25) and the extensible drive element (26), e.g., a toothed rack or a threaded spindle, may be arranged and connected correspondingly in other drive units.

A frame- or strap-shaped support head (27), which has a central passage (85) for the central workpiece (3), is used in the double-head machine according to FIGS. 1 and 2. An upsetting head (27), which offers an upsetting stop (28) acting on both sides for the components (3, 3'), is present in the double single-head machine according to FIG. 3. This stop (28) may be formed, e.g., by an insert (86). This may be arranged permanently or detachably at the upsetting head (27). It may, if needed, also be able to be mounted in the passage (85), so that the pressure welding device (1) may optionally also be operated with multiple functions as a double-head machine or double single-head machine.

The pressure welding device (1) has the actuating device (41) mentioned for the component mount (34) at the machine head (13). It preferably acts on the clamping element or clamping elements (40). The actuating device (41) has an actuating drive (65), which is arranged between the spindle drive (56) and the spindle (54) in the drive train (57). The actuating drive (65) is preferably arranged co-rotatingly in the drive train (57). FIGS. 2 and 6 illustrate this arrangement. The spindle drive (56), especially the drive motor (58), may be aligned here flush with the machine and spindle axis (6), which offers advantages in terms of the free selection of the motor and the economy resulting therefrom.

The actuating device (41) has an actuating drive (65) with an actuating element (66), which is shown in FIG. 6, is passed through the interior space of the hollow spindle (54) and acts on the adjusting element of the clamping elements (40), e.g., by an axial motion. The actuating drive (65), which is, e.g., a hydraulic or electric drive, has a jacket-shaped drive housing (67), which is connecting nonrotatingly to the motor shaft (59), on the one hand, and to the jacket of the hollow spindle (54), on the other hand, and transmits the drive torque of the drive (65) in a deformation- and loss-free manner.

The actuating device (41) further has a rotary feed device (69) for operating materials, e.g., hydraulic fluid or electric current, from the outside to the actuating drive (65) rotating with the spindle (54). A port is arranged for this for a flexible tube or a cable, not shown, on a stationary feed housing of the rotary feed device (69). Further, external lines (70) for removing overflow oil as well as a connection head (72), which may have a support function at the same time for the rotary feed device (69), are provided. Internal lines may be laid in the interior space or in the jacket of the spindle (54) to the output elements (66), e.g., a piston arrangement, optionally arranged in the spindle (54).

The actuating device (41) has a lightweight and compact design. It is arranged on a carrier (15, 16) of the corresponding machine head (13, 14) and is moved together with this.

A measuring device (not shown) with a measuring shaft for detecting the drive torque and optionally the drive speed may be arranged in the drive train (57) between the spindle drive (56) and the spindle (54). The measuring device may be inserted between the motor shaft (59) and the spindle (54) or the actuating device (41). The drive or motor shaft (59) may have a split configuration, the measuring shaft being inserted between the shaft halves. As an alternative, the drive or motor shaft (59) may be provided with suitable measuring elements and form the measuring shaft.

The pressure welding device (1) may have, according to FIG. 1, a machining device (18) associated with the machine head (13, 14) and/or with the additional component mount (36, 37) for machining the welded part (5, 5') after the welding process. The machining device (18) may optionally also be used for machining one or more yet to be connected components (2, 3, 3', 4). The machining device (18) is configured, e.g., as a cutting device, especially as a turn-off device or as a punch for the weld bead.

The pressure welding device (1) further has an adjusting device (17), with which a relative motion is generated between the machine head (13, 14) and the associated additional component mount (36, 37). This relative motion and the change in distance associated with it between the machine head (13, 14) and the component mount (36, 37) may be used for machining the welded part (5, 5') or optionally a component (2, 3, 3', 4). A plurality of adjusting devices (17) may be present.

The adjusting device (17) may have various configurations and arrangements. Two adjusting devices (17) are present in the variants shown in FIGS. 1 and 3, one adjusting device (17) each being associated with the central component mounts (36, 37). The simple single-head machine has only one adjusting device (17). Such an embodiment with machining on one side is also possible in FIGS. 1 and 3.

The adjusting device (17) may act in different manners. On the one hand, it may bring about the above-described relative motion and distance change for the machining. On the other hand, it may be used for a length adjustment for different components (21, 3, 3', 4) with different component lengths. It may bring about a compensation of insertion errors, component tolerances or even component elasticities in the welding process.

The adjusting device (17) has a controllable and variable-length coupling device (48, 49). A plurality of these devices may be present.

A coupling device (48) is located between the central component mount (36, 37) and the upsetting or support head (27) in the variants shown in FIGS. 1 and 3. It brings about the relative motion and distance change for the machining. It drives the component mount (36, 37) and moves same relative to the upsetting or support head (27), on which it is supported, on the other hand, secured on the frame.

Further, a coupling device (48) is arranged between the machine head (13, 14) and the associated additional component mount (36, 37). It drives and moves the component mount (36, 37), and it is supported at the support head (27). This coupling device (48) is used to compensate insertion errors, component tolerances or even component elasticities during the welding process.

The coupling devices (48, 49) may have identical configuration. They ensure the connection of the components (13, 14, 27, 36, 37) in the direction of the machine axis (6) and are preferably connected to the respective carriers (15, 16, 42, 43) thereof.

Various variants of the exemplary embodiments shown and described are possible. In particular, the features of the different exemplary embodiments may be combined with and also replaced by one another as desired. The upsetting drive (22) may have a conventional configuration, e.g., according to the state of the art mentioned in the introduction, and generate forces of pressure. The adjusting device (17) may have only one coupling device (48, 49) for the relative motion mentioned for the machining or a transposed arrangement of coupling devices (48, 49). An individual coupling device may, in addition, assume all the adjusting functions mentioned in case of a corresponding configuration.

In one variant, not shown, the pressure welding device (1) may have a plurality of, e.g., two, three or more central component mounts, which together fix the component (3) radially and axially as well as absorb the upsetting pressure. The component mounts may be arranged and supported stationarily on the machine frame (12). They may replace the upsetting stop (28). The support head (27) may have the mentioned passage (85) for a very long component (3). A single-head machine of this configuration has an expanded application and may also be used for excessively long components (3).

While specific embodiments of the invention have been shown and described in detail to illustrate the application of the principles of the invention, it will be understood that the invention may be embodied otherwise without departing from such principles.

The invention claimed is:

1. A pressure welding device, the pressure welding device comprising:
   a plasticization device;
   an upsetting device;
   component mounts for components to be welded together;
   a machine frame;
   a machine head with a rotatable spindle of the plasticization device and with one of the component mounts:
   a corresponding spindle drive, wherein said machine head is arranged movably on the machine frame, the spindle drive is arranged movably on the machine frame, and the machine head and the spindle drive are connected by a drive train on the machine frame; and
   a controllable mass decoupling device arranged between the spindle drive and the machine head, wherein the machine head and the spindle drive are arranged one after another and movable, and displaceable along a machine axis on the machine frame,
   wherein the controllable mass decoupling device comprises a detachable coupling device comprising a coupling rod connected to the spindle drive and to the machine head, and a detachable locking device for detachably locking the coupling rod to the spindle drive and/or to the machine head.

2. A pressure welding device in accordance with claim 1, further comprising, wherein the controllable mass decoupling device has an axially tolerant coupling in the drive train, the drive train extending along the machine axis and the being aligned with same, the drive train being located between the component mount and the spindle drive.

3. A pressure welding device in accordance with claim 1, wherein the spindle drive and the machine head are arranged each on a slide-shaped carrier, wherein the detachable coupling device is connected to the carriers.

4. A pressure welding device in accordance with claim 1, wherein the spindle drive has a controllable drive fixing device for temporary fixing the spindle drive at the machine frame.

5. A pressure welding device in accordance with claim 1, wherein the pressure welding device has a motion sensor for the machine head, comprising an acceleration sensor, for the travel motion thereof on the machine frame.

6. A pressure welding device in accordance with claim 1, wherein the controllable mass decoupling device is controlled such that the machine head and the movable spindle drive are coupled for a joint motion during a feed stroke and that the machine head is decoupled from the spindle drive and is moved independently during a process stroke.

7. A pressure welding device in accordance with claim 1, wherein the machine head is functionally connected to an upsetting drive of the upsetting device.

8. A pressure welding device in accordance with claim 1, wherein the upsetting device comprises:
   an upsetting or support head secured on the frame; and
   an upsetting drive with two or more parallel drive units, which two or more parallel drive units are arranged longitudinally and are disposed on both sides of and next to the machine axis, wherein said upsetting drive is arranged between the machine head and the upsetting or support head and acts by pulling the machine head relative to the upsetting or support head.

9. A pressure welding device in accordance with claim 8, wherein the drive units are arranged at different levels above the machine frame and one of the drive units is located adjacent to an operating area of the pressure welding device and is arranged in a lower location than an opposite other drive unit.

10. A pressure welding device in accordance with claim 1, wherein the spindle drive has a drive motor, which is arranged essentially flush with a machine axis and with the spindle axis.

11. A pressure welding device in accordance with claim 1, wherein the pressure welding device is configured as a friction welding device, wherein the plasticization device has a friction device.

12. A pressure welding device in accordance with claim 1, wherein the pressure welding device is configured as a welding device with a magnetically moved arc, wherein the plasticization device has an arc device.

13. A method for pressure welding components by means of a pressure welding device, which has a plasticization device and an upsetting device as well as component mounts for the components to be welded together and a machine frame as well as a machine head, the method comprising the steps of:
- arranging the machine head movably on the machine frame with a rotatable spindle and with a component mount as well as a corresponding spindle drive;
- arranging the spindle drive movably on the machine frame;
- arranging the machine head and the spindle drive connected by a drive train on the machine frame;
- reducing a moving mass by a controllable mass decoupling device between the spindle drive and the machine head to effect a mass decoupling between the spindle drive and the machine head, wherein the controllable mass decoupling device comprises a detachable coupling device comprising a coupling rod connected to the spindle drive and to the machine head, and a detachable locking device for detachably locking the coupling rod to the spindle drive and/or to the machine head;
- arranging the machine head and the spindle drive one after another; and
- moving and displacing the machine head and the spindle drive along a machine axis on the machine frame to effect a distance change between the machine head and the spindle drive.

14. A method in accordance with claim 13, wherein the rotating drive torque is transmitted to the decoupled machine head by means of an axially tolerant coupling, wherein the driving motion is transmitted by the drive train, extending along the machine axis and being aligned with same, the drive train being located between the component mount and the spindle drive.

15. A method in accordance with claim 13, wherein the spindle drive is carried along by a feed stroke of the machine head.

16. A method in accordance with claim 13, wherein the mass decoupling and the distance change take place only during a process stroke.

17. A method in accordance with claim 13, wherein the motion characteristics of the machine head are detected during the process with a motion sensor comprising an acceleration sensor.

18. A method in accordance with claim 13, wherein the components to be welded together are plasticized on their front edges facing each other by friction or by a rotatingly moved arc.

* * * * *